US011477638B2

(12) United States Patent
Austin et al.

(10) Patent No.: US 11,477,638 B2
(45) Date of Patent: *Oct. 18, 2022

(54) SECURELY CONVEYING LOCATION AND OTHER INFORMATION IN ADVANCED NETWORKS

(71) Applicant: AT&T Intellectual Property I, L.P., Atlanta, GA (US)

(72) Inventors: Mark D. Austin, Allen, TX (US); Sheldon Meredith, Roswell, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 108 days.

This patent is subject to a terminal disclaimer.

(21) Appl. No.: 17/028,480

(22) Filed: Sep. 22, 2020

(65) Prior Publication Data

US 2021/0006971 A1 Jan. 7, 2021

Related U.S. Application Data

(63) Continuation of application No. 16/210,538, filed on Dec. 5, 2018, now Pat. No. 10,798,566.

(51) Int. Cl.
*H04W 12/03* (2021.01)
*H04W 4/80* (2018.01)
(Continued)

(52) U.S. Cl.
CPC ............ *H04W 12/03* (2021.01); *H04W 4/025* (2013.01); *H04W 4/12* (2013.01); *H04W 4/80* (2018.02);
(Continued)

(58) Field of Classification Search
None
See application file for complete search history.

(56) References Cited

U.S. PATENT DOCUMENTS 6,157,330 A 12/2000 Bruekers et al.
6,185,312 B1 2/2001 Nakamura et al.
(Continued)

FOREIGN PATENT DOCUMENTS

WO 2012019055 A1 2/2012

OTHER PUBLICATIONS

Robillard, David E., "Adaptive Software Radio Steganography", arxiv.org Apr. 27, 2013, 8 pages.
(Continued)

*Primary Examiner* — Diane L Lo
(74) *Attorney, Agent, or Firm* — Amin, Turocy & Watson, LLP

(57) ABSTRACT

Facilitating secure conveyance of location information and other information in advanced networks (e.g., 4G, 5G, and beyond) is provided herein. Operations of a system can comprise transforming, at a chipset level of the device, information indicative of a location of the device into a binary representation of the information indicative of the location of the device. The operations can also comprise embedding the binary representation of the information indicative of the location of the device into a message. Further, the operations can comprise facilitating a transmission of the message and the binary representation of the information indicative of the location of the device to a network device of a communications network.

20 Claims, 10 Drawing Sheets

(51) Int. Cl.
   *H04W 12/63*   (2021.01)
   *H04W 4/02*   (2018.01)
   *H04W 72/04*   (2009.01)
   *H04W 72/08*   (2009.01)
   *H04W 4/12*   (2009.01)

(52) U.S. Cl.
   CPC ....... *H04W 12/63* (2021.01); *H04W 72/0453* (2013.01); *H04W 72/087* (2013.01)

(56) References Cited

U.S. PATENT DOCUMENTS

| | | |
|---|---|---|
| 6,263,087 B1 | 7/2001 | Miller |
| 6,345,100 B1 | 2/2002 | Levine |
| 7,099,492 B2 | 8/2006 | Rhoads |
| 7,159,117 B2 | 1/2007 | Tanaka |
| 7,471,953 B2 | 12/2008 | Ruutu et al. |
| 8,045,749 B2 | 10/2011 | Rhoads et al. |
| 8,135,413 B2 | 3/2012 | Dupray |
| 8,634,796 B2 | 1/2014 | Johnson |
| 8,665,858 B2 | 3/2014 | Weill et al. |
| 8,750,915 B2 | 6/2014 | Shuman |
| 9,109,903 B2 | 8/2015 | Wu et al. |
| 9,258,680 B2 | 2/2016 | Drucker |
| 9,591,439 B2 | 3/2017 | Yang |
| 9,602,990 B2 | 3/2017 | Fischer et al. |
| 9,788,151 B2 | 10/2017 | Duan et al. |
| 10,080,098 B1 | 9/2018 | Edge |
| 10,425,770 B2 | 9/2019 | Zhong et al. |
| 2004/0002346 A1 | 1/2004 | Santhoff |
| 2007/0165850 A1 | 7/2007 | Van Der Veen et al. |
| 2007/0189600 A1 | 8/2007 | Shi et al. |
| 2008/0125083 A1* | 5/2008 | Rhoads ................. G06T 1/0064 455/410 |
| 2011/0159884 A1* | 6/2011 | Chawla ............ H04W 52/0258 455/456.1 |
| 2011/0165905 A1* | 7/2011 | Shuman ................ H04W 76/40 455/518 |
| 2011/0235804 A1 | 9/2011 | Snyder |
| 2014/0011514 A1 | 1/2014 | Gu et al. |
| 2017/0142674 A1 | 5/2017 | Centonza et al. |
| 2017/0208116 A1* | 7/2017 | Schilit .................. G06F 3/0484 |
| 2017/0337394 A1 | 11/2017 | Wang et al. |
| 2018/0152910 A1* | 5/2018 | Ryu .......................... G01S 5/02 |
| 2019/0182665 A1 | 6/2019 | Edge |

OTHER PUBLICATIONS

Sayed et al., "Network-based wireless location: challenges faced in developing techniques for accurate wireless location information", IEEE Signal Processing Magazine [24] Jul. 2005, 17 pages.

Caffery, Jr. et al., "Overview of radiolocation in CDMA cellular systems", IEEE Communications Magazine Apr. 1998, 8 pages.

Steganography. Wikipedia; https://en.wikipedia.org/wiki/Steganography. Last Accessed Mar. 5, 2019. 13 pages.

Non-Final Office Action received for U.S. Appl. No. 16/210,538 dated Feb. 28, 2020, 20 pages.

U.S. Appl. No. 16/210,538, filed Dec. 5, 2018.

* cited by examiner

| Value Reported | Actual (dBm) |
|---|---|
| 0 | RSRP < -140 |
| 1 | -140 ≤ RSRP ≤ -139 |
| 2 | -139 ≤ RSRP ≤ -138 |
| 3 | -138 ≤ RSRP ≤ -137 |
| 4 | -137 ≤ RSRP ≤ -136 |
| ......... | ......... |
| n | n-139 ≤ RSRP ≤ n-140 |
| ......... | ......... |
| 87 | -54 ≤ RSRP ≤ -53 |
| 88 | -53 ≤ RSRP ≤ -52 |
| 89 | -52 ≤ RSRP ≤ -51 |
| 90 | -51 ≤ RSRP ≤ -50 |
| 91 | -50 ≤ RSRP ≤ -49 |
| 92 | -49 ≤ RSRP ≤ -48 |
| 93 | -48 ≤ RSRP ≤ -47 |
| 94 | -47 ≤ RSRP ≤ -46 |
| 95 | -46 ≤ RSRP ≤ -45 |
| 96 | -45 ≤ RSRP ≤ -44 |
| 97 | -44 ≤ RSRP |

FIG. 4

SECURELY CONVEYING LOCATION AND OTHER INFORMATION IN ADVANCED NETWORKS

RELATED APPLICATION

The subject patent application is a continuation of, and claims priority to, U.S. patent application Ser. No. 16/210,538 (now U.S. Pat. No. 10,798,566), filed Dec. 5, 2018, and entitled "SECURELY CONVEYING LOCATION AND OTHER INFORMATION IN ADVANCED NETWORKS," the entirety of which application is hereby expressly incorporated by reference herein.

TECHNICAL FIELD

This disclosure relates generally to the field of mobile communication and, more specifically, to facilitating location determination in wireless communication systems for advanced networks (e.g., 4G, 5G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which:

FIG. 4 illustrates a non-limiting example of Received Signal Code Power coding in Long Term Evolution in accordance with one or more embodiments described herein;

DETAILED DESCRIPTION

Figure 1:
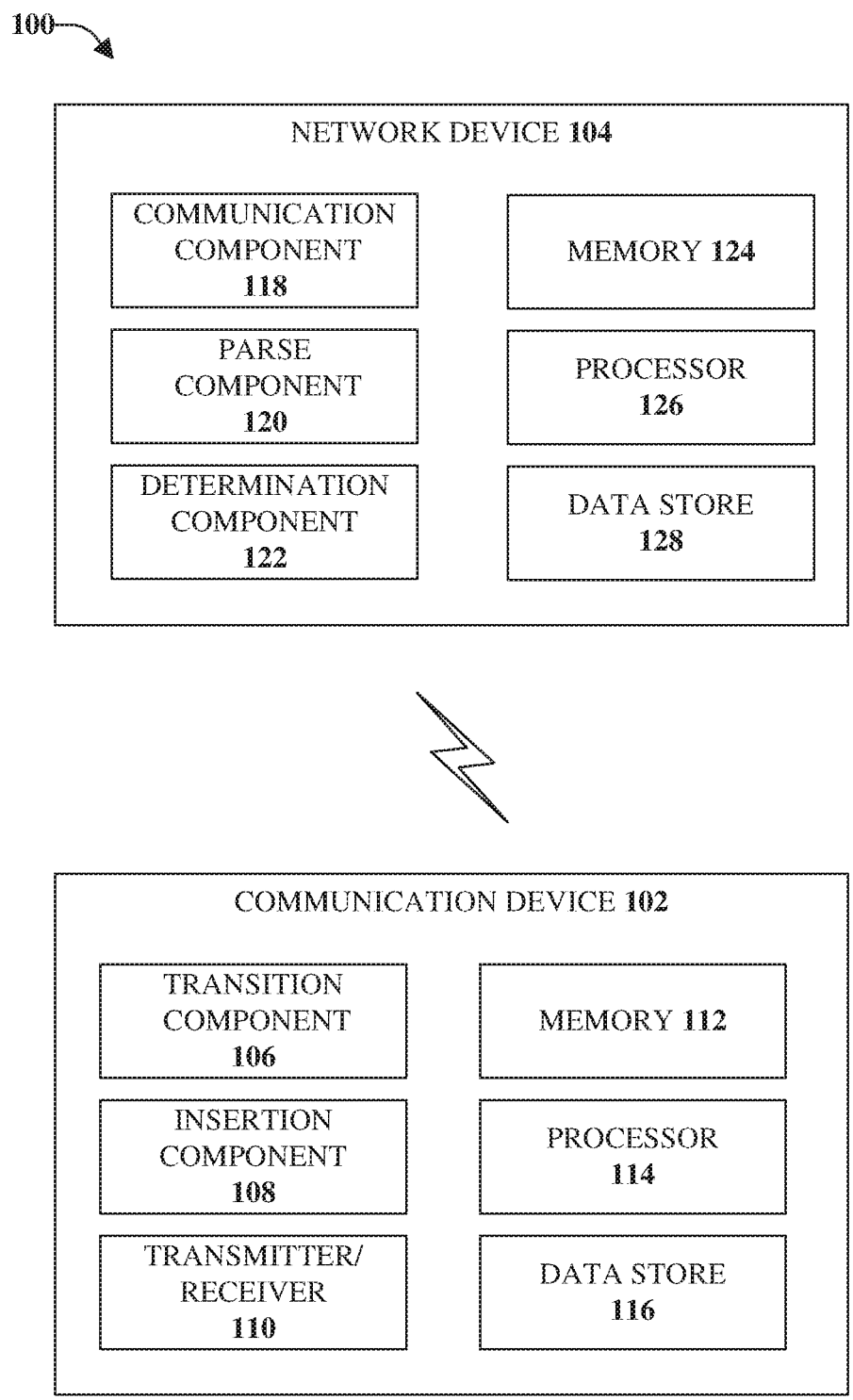
FIG. 1 illustrates an example, non-limiting, system for securely conveying location and other information in advanced networks in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate securely conveying location and other information in advanced networks. In one embodiment, described herein is a system that can comprise a processor and a memory that stores executable instructions that, when executed by the processor, facilitate performance of operations. The operations can comprise transforming, at a chipset level of the device, information indicative of a location of the device into a binary representation of the information indicative of the location of the device. The operations can also comprise embedding the binary representation of the information indicative of the location of the device into a message. Further, the operations can comprise facilitating a transmission of the message and the binary representation of the information indicative of the location of the device to a network device of a communications network.

In an implementation, the operations can comprise selecting the message from a group of messages based on an occurrence frequency of the transmission of the message being determined to satisfy a defined occurrence frequency level. Further to this implementation, embedding the binary representation can comprise embedding the binary representation in least significant bits of the message. In an additional, or alternative, implementation, the defined occurrence frequency level can be selected to retain a defined radio link performance level of a radio link of the communications network.

According to some implementations, the operations can comprise receiving the information indicative of the location of the device from a radio beacon within a vicinity of the device during a defined time period. Further to these implementations, the information indicative of the location of the device comprises proxy information that is related to the location of the device, and that is indirectly converted into location information. In an example, the radio beacon can be received from a Wi-Fi enabled device via a Wi-Fi communications link of the communications network. In another example, the radio beacon can be received from a Bluetooth enabled device via a Bluetooth communications link of the communications network. According to another example, the radio beacon can be received from a near field communication enabled device via a near field communications link of the communications network.

In accordance with some implementations, the operations can comprise prior to the facilitating the transmission of the message, facilitating a conveyance of a preamble that indicates a start of the binary representation of the information indicative of the location of the device. According to some implementations, embedding the binary representation can comprise using steganography to embed the binary representation in the message.

Another embodiment relates to a method that can comprise receiving, by a device of a communications network, information indicative of a location of the device from a radio beacon within a vicinity of the device during a defined time period. The device can comprise a processor. The method can also comprise embedding, by the device, a preamble and a binary representation of the information indicative of the location into a message directed to a network device of the communications network. The preamble can provide an indication of a start of the binary representation of the information indicative of the location of the device. Further, the method can comprise communicating, by the device, the message that comprises the preamble and the binary representation to the network device.

In an example, embedding the binary representation can comprise embedding the binary representation in a group of least significant bits of the message. In another example, the preamble can comprise a synchronization signal of bits. In a further example, the information indicative of the location of the device can be proxy information that is related to the location of the device, and the proxy information does not comprise global positioning system information.

Yet another embodiment relates to a method that can comprise receiving, by a network device of a communications network, a transmission from a mobile device. The transmission can comprise a first message embedded in a second message. The first message can comprise information indicative of a location of the mobile device. The network device can comprise a processor. Further, the method can comprise separating, by the network device, a first group of bits in the first message from a second group of bits in the first message. In addition, the method can comprise determining, by the network device, the location of the mobile device based on a determination that the second group of bits in the first message comprise a synchronization signal.

According to an implementation, the first group of bits in the first message can be least significant bits of the first message. Further, the method can comprise determining, by the network device, that the least significant bits of the first message constitute a preamble that indicates the information indicative of the location of the mobile device is included in the second group of bits of the first message.

In some implementations, determining the location of the mobile device can comprise translating the information indicative of the location of the mobile device to a geographic location of the mobile device. In another example, the first message and the second message can be received signal code power messages.

The various aspects discussed herein can allow a communication device (e.g., a mobile device, a user equipment (UE) and the like) to convey location or other information from radio chipset vendors in a secure way to network operators without the need for any standards, handset vendor, and/or new message changes.

The various aspects also provide multiple levels of security, which only allows viewing of such information based on permissions (e.g., decoding keys) from the chipset provider, handset owner, and what accuracy level and frequency is permitted. While the disclosed aspects describe conveying "location information," it is equally applicable to any information that is known and desired to be transmitted from the radio chipset on the device.

Collecting knowledge of accurate location of devices can be important for several reasons. For example, accurate location information helps in network planning, network optimization, can be useful for user knowledge of their location, can be useful to location based advertising, and so on. Knowing precise device location is particularly important in network planning and optimization as wireless networks become mature, since capacity can only be added by using small cells, nano cells, or pico cells, each having a very small coverage radius of 10-50 meters. If the small cells are not placed where the traffic actually is coming from, the small cells will not serve as many calls/data sessions as might be needed, and the capacity problem would, therefore, not be solved.

Although precise location can be important, it cannot be collected due to several challenges. For example, accurate location using methods such as "Global Positioning System (GPS) are not available since the handset could be "indoors." Further, the handset vendor might not allow the phone to "report GPS location" via a layer 3 message, unless the message is related to a 911 call. In another example, the phone may "know critical information related to location, which can be turned into location when combined with data in the cloud" but it has no way to send this information to the network via existing layer 2 messages. The disclosed aspects solve these and related issues.

Referring initially to FIG. 1, illustrated is an example, non-limiting, system 100 for securely conveying location and other information in advanced networks in accordance with one or more embodiments described herein. Aspects of systems (e.g., the system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 1, the system 100 can include a communication device 102 and a network device 104. The network device 104 can be included in a group of network devices of a wireless network. Although only a single communication device and a single network device are shown and described, the various aspects are not limited to this implementation. Instead, multiple communication devices and/or multiple network devices can be included in a communications system.

The communication device 102 can include a transition component 106, an insertion component 108, a transmitter/receiver 110, at least one memory 112, at least one processor 114, and at least one data store 116. The network device 104 can include a communication component 118, a parse component 120, a determination component 122, at least one memory 124, at least one processor 126, and at least one data store 128.

The transmitter/receiver 110 can obtain information about a location of the device, which can be direct information and/or indirect information. Direct location information can be, for example, GPS information from a GPS chipset on the handset. Examples of indirect information can include, a Wi-Fi access point ID, a MAC address. To utilize the indirect information, at the network carrier (e.g., the network device 104), the indirect information can be associated (e.g., in a data structure contained in the at least one data store 128). For example, if there is a record (e.g., data structure, data store, and so on) of where wireless access points are located and the communication device conveys that information to the network device 104 (as will be discussed in further detail below), the location of the communication device 102 can be determined. In an example of the indirect location information, the communication device 102 might only know that it can see a device (e.g., can receive a signal from the device), which can be any communication-enable device within the vicinity of the communication device 102. Therefore, the communication device 102 can simply indicate that it can detect a beacon from one or more communication-enable devices. Since the network device 104 has a data structure that maps the communication-enable device to its location, a determination can be made as to the location of the communication device 102.

The transition component 106 can be configured to transform information indicative of a location of the communication device 102 into a binary representation of the information indicative of the location of the communication device 102. According to some implementations, the transformation by the transition component 106 can be performed at a chipset level 130 of the communication device 102.

The insertion component 108 can be configured to embed binary representation of the information indicative of the location of the device into a message. Further, the transmitter/receiver 110 can be configured to facilitate a transmission of the message and the binary representation of the information indicative of the location of the device to the network device 104.

For example, the disclosed aspects can allow a radio chipset (e.g., the chipset level 130), that has knowledge of location and/or derived location information, to send the information to the network (e.g., the network device 104). According to some implementations, the insertion component 108 can apply a concept of steganography to embed the binary representation of the information indicative of the location of the device into a message. The application of steganography can facilitate concealing a message within another message. An example of the use of steganography is to embed a message within an image. For instance, this can easily be performed by encoding the message in every defined number pixel (e.g., every one hundredth pixel) of an image by making the least significant bit(s) equal to the digits of a letters of the message. As applied to the radio chipset example, a similar approach can be performed by embedding the location information into the least significant bit(s) of existing radio measurements that the chipset sends to the network, which can also be captured in log files on the network.

Figure 2:
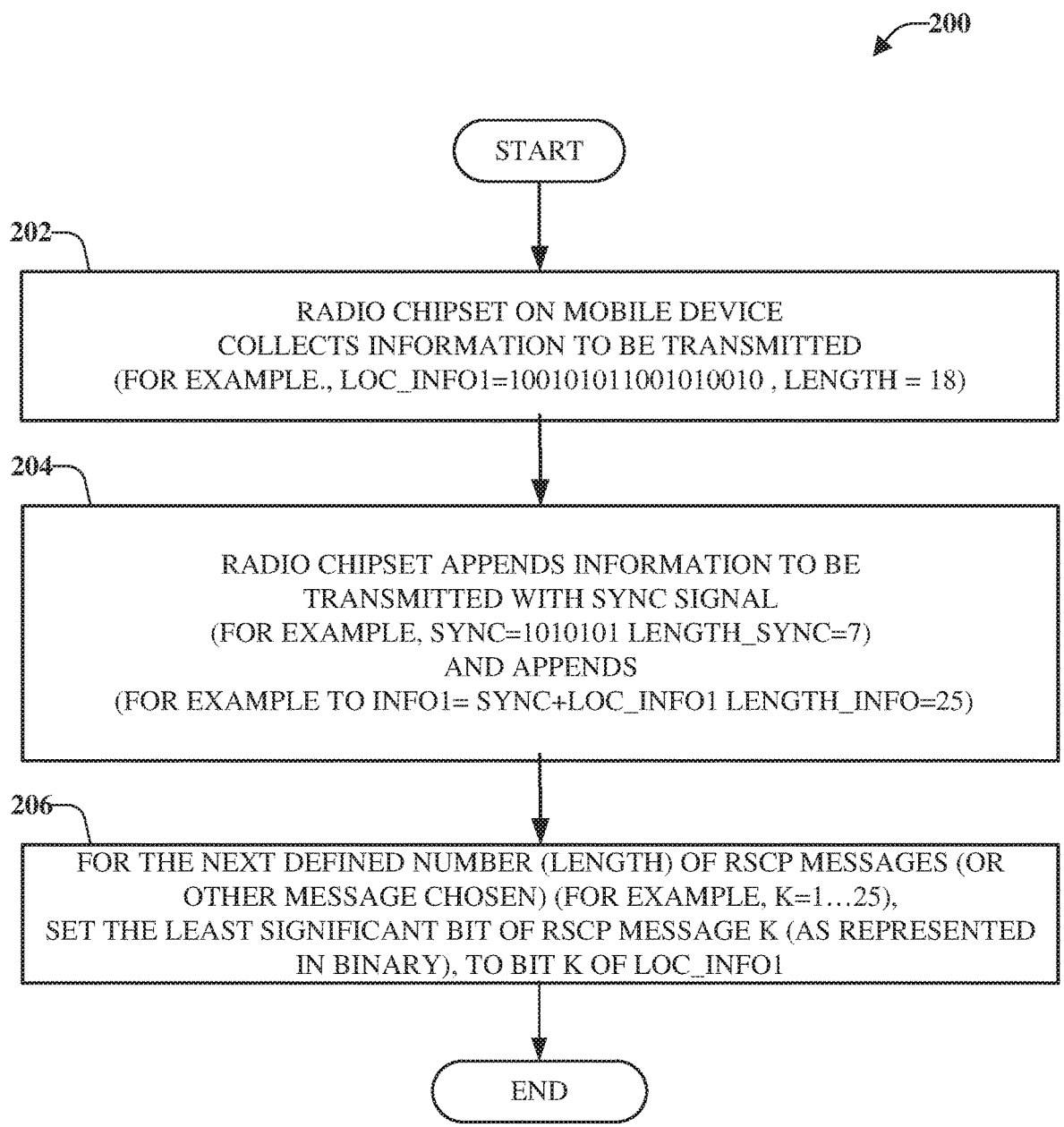
FIG. 2 illustrates a flow chart of an example, non-limiting, method for chipset encoding of information in accordance with one or more embodiments described herein.

In order to describe the various aspects, a simplified version, not including the security aspects, will be described with respect to FIG. 2, which illustrates a flow chart of an example, non-limiting, method 200 for chipset encoding of information in accordance with one or more embodiments described herein. Repetitive description of like elements employed in other embodiments described herein is omitted for sake of brevity.

At 202, the radio chipset (e.g., the chipset level 130) on the mobile device (e.g., the communication device 102) can collect information to be transmitted. In some implementations, the radio chipset can have knowledge of location related information. For example, the location related information can be information that is related to location but cannot be directly turned into location at the device level without further processing. Such processing can occur in a cloud computing environment, for example. In some cases, the location information can be collected from an associated GPS measurement on the device. According to some cases, the location information can be collected using more sophisticated range finding approaches (e.g., possibly with multipath mitigation).

Further, at 202, the radio chipset (e.g., the transition component 106) can translate the information to be embedded into a binary representation. For example, assuming the information is related to location information (e.g. Location_info1=100101011001010010,
Location_info2=1000100xxx . . . 1). It is noted that this location information can represent relative timing offsets as seen from a given cell site.

Using the concept of steganography, at 204, a message can be chosen into which the location information can be embedded. The chosen message can be a message that is transmitted more than a defined threshold level. For example, the message could be a message that is transmitted often (periodically) in a manner such that the integrity of the message will not cause any significant impairment to the radio link performance if the location information is embedded in the least significant bits of the message.

For example, in LTE the RSRP (signal strength measurement) could be used as the host for the location information. The RSRP can span from −44 dBm to −140 dBm and can be represented by one of 100 values (e.g., having 1 dB resolution), and can be sent periodically. Since modifying the least significant bit only results in a 1 dB change up or down on any given RSRP reported measurement, there will not be a significant radio channel performance impact.

Nevertheless, since the location information data is a certain length of bits (e.g., 25 "bits" in length), it will take 25 Received Signal Code Power (RSCP) measurements to transmit each one entirely. This could be performed by embedding in sequential RSCP measurements according to some implementations. Alternatively, or additionally, since these measurements often come from multiple cell sites, they could be embedded across the different measurements in a given report (e.g. if there are 25 RSCP measurements in a given report, the entire latitude could be embedded in those measurements).

Since the embedded information may not need to be sent all the time, according to some implementations, sending a synchronization signal of bits could be sent, such that the start of the embedded information can be detected (for example before 206).

It is noted that although discussed with respect to RSCP, the disclosed aspects can be related to control plane messages. In order to control the UE (e.g., the communication device 102) at a radio level (e.g., start call, stop call, hands off, power up, power down, and so on), these can be pursuant to controlling radio of the phone as opposed to applications on the phone. Control plane messages are fundamental to controlling the UE as a device (e.g., as a communication device), as opposed to higher level functions. Thus, the disclosed aspects relate to transmitting information from the communication device 102 to the network device 104 using this lowest layer of operation of the UE and encoding information in the least significant digits in the control plane messages. The communication device 102 (e.g., via the transmitter/receiver 110) can send location, a proxy for location (e.g., proxy data received from an Internet of Things (IOT) device and/or other communication-enabled devices), and/or any other information appropriate for the communication device 102 to send at this lowest level, wherein such data or information otherwise might be blocked at a higher level. For example, a device manufacturer or other entity might not allow the communication device 102 to send accurate GPS information. Accordingly, the information can be blocked at a high level. However, with the disclosed aspects, the information is not blocked at the chipset level, and, thus, the chipset on the communication device 102 can convey the information to the network device 104.

Figure 3:
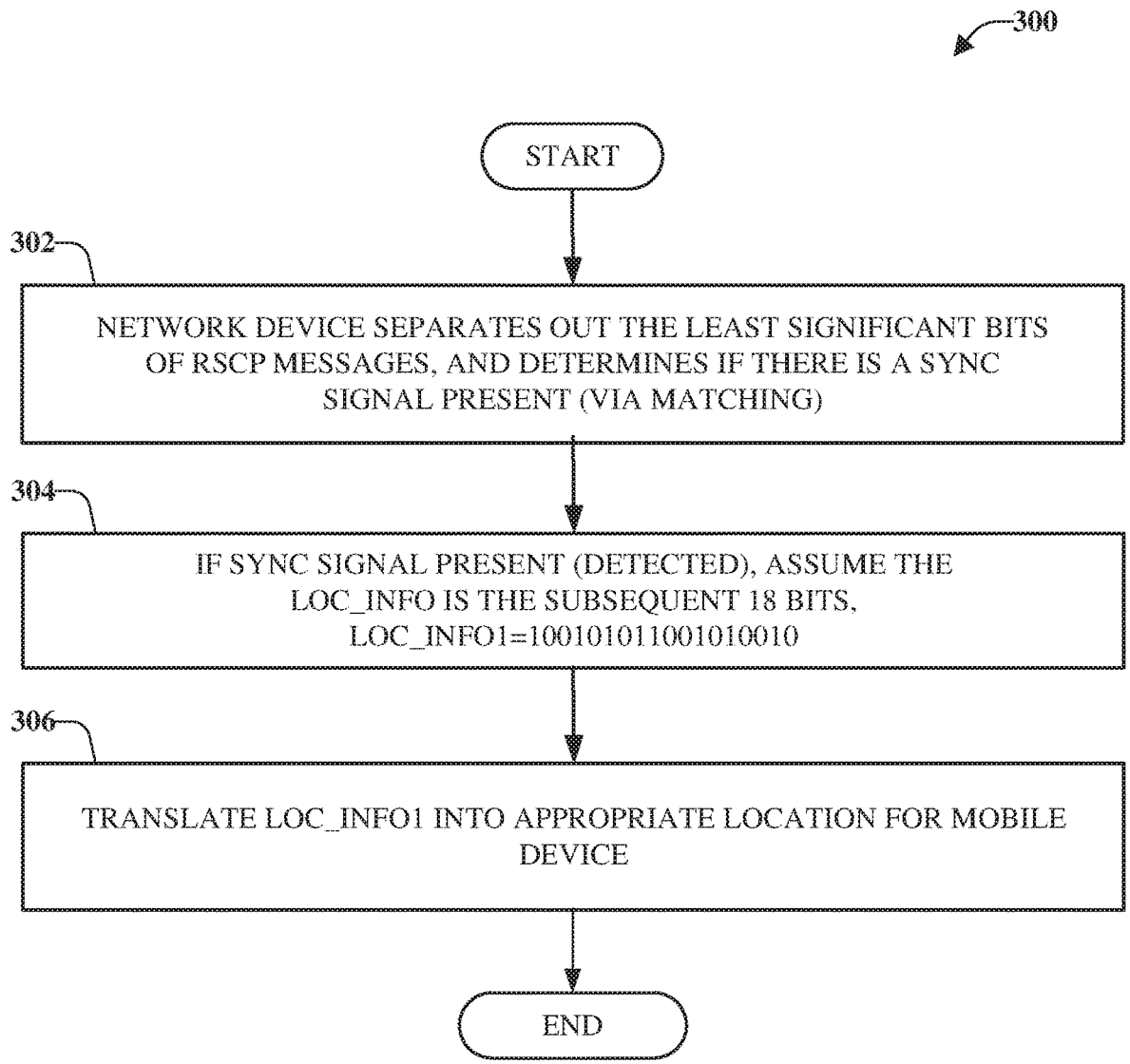
FIG. 3 illustrates a flow chart of an example, non-limiting, method for decoding of information at a network device in accordance with one or more embodiments described herein.

FIG. 3 illustrates a flow chart of an example, non-limiting, method 300 for decoding of information at a network device in accordance with one or more embodiments described herein. Repetitive description of like elements employed in other embodiments described herein is omitted for sake of brevity.

At 302, the network device (e.g., the network device 104) can separate out the least significant bits of the RSCP messages (or other messages). Upon or after separating the least significant bits, a determination can be made whether there is a synchronization signal present. According to some implementations, the determination can be made based on match.

If a synchronization signal is present (e.g., detected), at 304, it can be assumed that the location information is included in the next subsequent bits, which can be a defined number of bits. For example, it can be assumed that the location information (Loc_info) is in the subsequent eighteen bits (Loc_info1=1001010110010100100). At 306, the location information can be translated into appropriate location information for the mobile device.

Additionally, provided security of the data can be an issue, therefore, the information to be sent could be "encrypted beforehand" and then sent. The encryption could be a multi-fold encryption requiring a key from the user, handset and operator to decode. In the flow diagrams of FIG. 2 and FIG. 3, this amounts to encrypting the non-synchronization data field which is not shown in FIGS. 2 and 3.

FIG. 4 illustrates a non-limiting example of Received Signal Code Power coding 400 in Long Term Evolution in accordance with one or more embodiments described herein. It is noted that the values reported can also be represented in binary format, as shown. In an example, the binary value of 87 is 01010111.

The disclosed aspects solve various challenges in collecting information from chipsets. For example, a challenge can be that accurate location using methods such as "GPS" are not available since the handset is "indoors." To address this challenge, the disclosed aspects can use other location related data. The related data can include relative timing offset data collected from the mobile of the cell sites. This data can be sent to the network which is combined into the cloud with other data to estimate the mobile location.

Another challenge can be that the handset vendor will not allow the phone to "report GPS location" via a layer 3 message unless its related to a 911 call. To address this challenge, the disclosed aspects can send location related data via the layer 2 embedded message instead.

Further, another challenge can be that the phone may "know critical information related to location, which can be turned into location when combined with data in the cloud" but it has no way to send this information to the network via existing layer 2 messages. Therefore, to address this challenge the disclosed aspects can send location related data via layer 2 embedded message instead.

The one or more embodiments can provide a mechanism to arbitrarily send information, that the chipset knows, to the network by embedding such information in existing message data, in a minimal performance impacting way using steganography so that it can be extracted on the network side. An application of important information described herein is the ability to send "location related information" that the chipset may be able to measure, such as the "ranging information" (timing offsets of cell sites) as measured, which can be converted to location if sent to the network. While there are many messages this could be embedded into, an example of embedding such information into the least significant bits of the RSCP values in LTE was provided as an example.

Finding accurate locations of mobile traffic can be important in network applications where one wants to place the cell sites as close as possible to the traffic, since a cell site placed twice the distance away will require four times the amount of power to serve the same traffic (this equates to needing four times the number of cell sites to serve the same level traffic). Thus, having errors into where an estimation of the real traffic to be could result in hundreds of millions of dollars of cost for additional cell sites for a large-scale operator deploying tens of thousands of cell sites (e.g. small cells).

The applicability of the disclosed aspects can be effective worldwide, since wireless mobile devices are everywhere in the world. The various aspects provide benefits that can be significant and timely given that it can be important to collect accurate location data for cell site location placement of the ever-growing small cell deployments around the world. Accurate location of a devices is also very important for advertising and other location based services and could be used with the right privacy and legal permissions.

With continuing reference to FIG. 1, the transmitter/receiver 110 (and/or the communication component 118) can be configured to transmit to, and/or receive data from, the network device 104 (or the communication device 102), other network devices, and/or other communication devices. Through the transmitter/receiver 110 (and/or the communication component 118), the communication device 102 (and/or the network device 104) can concurrently transmit and receive data, can transmit and receive data at different times, or combinations thereof. According to some implementations, the transmitter/receiver 110 (and/or the communication component 118) can facilitate communications between an identified entity associated with the communication device 102 (e.g., an owner of the communication device 102, a user of the communication device 102, and so on) and another communication device (e.g., or an entity associated with the other communication device). Further, the transmitter/receiver 110 (and/or the communication component 118) can be configured to receive, from the network device 104 or other network devices, various content including multimedia content.

The at least one memory 112 can be operatively connected to the at least one processor 114. Further, the at least one memory 124 can be operatively connected to the at least one processor 126. The memories (e.g., the at least one memory 112, the at least one memory 124) can store executable instructions that, when executed by the processors (e.g., the at least one processor 114, the at least one processor 126) can facilitate performance of operations. Further, the processors can be utilized to execute computer executable components stored in the memories.

For example, the memories can store protocols associated with securely conveying location and other information as discussed herein. Further, the memories can facilitate action to control communication between the communication device 102 and the network device 104 such that the system 100 can employ stored protocols and/or algorithms to achieve improved communications in a wireless network as described herein.

The memories can store respective protocols associated with securely conveying information, including location information, taking action to control communication between the communication device 102 and the network device 104, such that the system 100 can employ stored protocols and/or algorithms to achieve improved communications in a wireless network as described herein. It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The processors can facilitate respective analysis of information related to transmitted information embedded in one or more messages in a communication network. The processors can be processors dedicated to analyzing and/or generating information received, a processor that controls one or more components of the system 100, and/or a processor that both analyzes and generates information received and controls one or more components of the system 100.

Further, the term network device (e.g., network node, network node device) is used herein to refer to any type of network node serving communication devices and/or connected to other network nodes, network elements, or another network node from which the communication devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 104) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an Remote Radio Unit (RRU), a Remote Radio Head (RRH), nodes in distributed antenna system (DAS), and the like.

Figure 5:
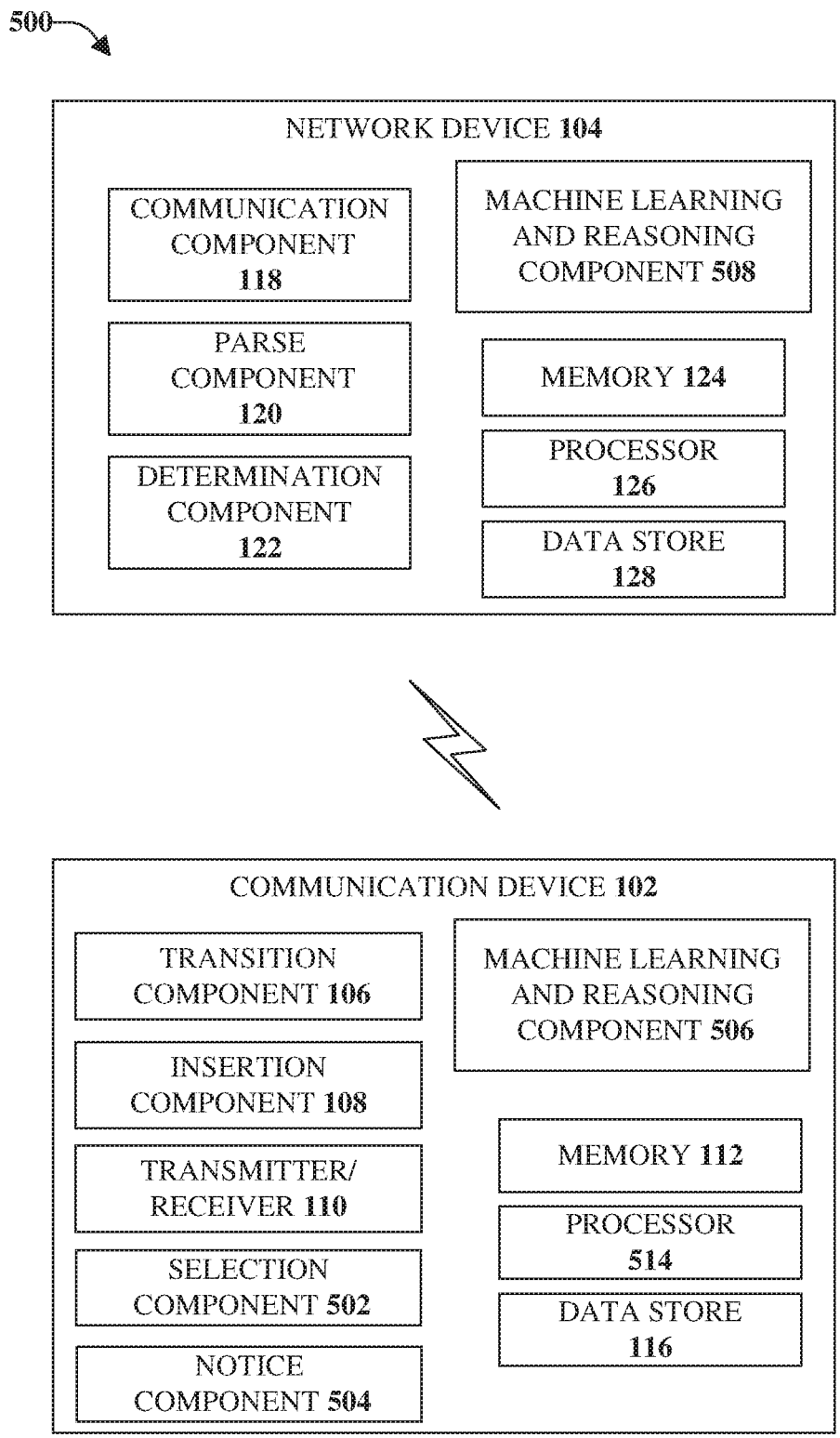
FIG. 5 illustrates an example, non-limiting, system for securely conveying information in accordance with one or more embodiments described herein.

FIG. 5 illustrates an example, non-limiting, system 500 for securely conveying information in accordance with one or more embodiments described herein. Repetitive description of like elements employed in other embodiments described herein is omitted for sake of brevity.

The system 500 can comprise one or more of the components and/or functionality of the system 100, and vice versa. As illustrated, the communication device 102 can comprise a selection component 502 that can be configured to select a message from a group of messages. The selection can be based on an occurrence frequency of the transmission of the message being determined to satisfy a defined occurrence frequency level. The defined occurrence frequency level can be selected to retain a defined radio link performance level of a radio link of the communications network. The binary representation can be embedded, by the insertion component 108, into least significant bits of the selected message. The insertion component 108 can use steganography to embed the binary representation in the message.

According to some implementations, the transmitter/receiver 110 can receive the information indicative of the location of the device from a radio beacon within a vicinity of the device during a defined time period. The information indicative of the location of the device can be proxy information that can be related to the location of the device. The proxy information can be indirectly converted into location information.

The radio beacon can be received from various devices including Internet of Thing devices. In another example, the radio beacon can be received from a Wi-Fi enabled device via a Wi-Fi communications link of the communications network. In another example, the radio beacon can be received from a Bluetooth enabled device via a Bluetooth communications link of the communications network. In a further example, the radio beacon can be received from a near field communication enabled device via a near field communications link of the communications network.

According to some implementations, a notice component 504 can be configured to convey a preamble that indicates a start of the binary representation of the information indicative of the location of the device. Upon or after transmission of the preamble, the transmitter/receiver 110 can facilitate the transmission of the message.

According to some implementations, the system 500 can comprise one or more machine learning and reasoning components 506, 508 that can be utilized to automate one or more of the disclosed aspects. The one or more machine learning and reasoning components 506, 508 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the one or more machine learning and reasoning components 506, 508 can employ principles of probabilistic and decision theoretic inference. Additionally, or alternatively, the one or more machine learning and reasoning components 506, 508 can rely on predictive models constructed using machine learning and/or automated learning procedures. Logic-centric inference can also be employed separately or in conjunction with probabilistic methods.

The one or more machine learning and reasoning components 506, 508 can infer which information should be included in a message, which message to select, whether or not to use a preamble, and/or which information does not need to be included in the report (e.g., message). Such inference can be performed by the one or more machine learning and reasoning components 506, 508 by obtaining knowledge about the communication device 102, the network device 104, the communication network, the device from which location information was received, device (e.g., communication device 102, network device 404) preferences, and so on. The inference can be performed at about the same time as a request is received from the network device 104 (e.g., via the transmitter/receiver 110) and/or at about the same time as information indicative of location information is received.

Based on this knowledge, the one or more machine learning and reasoning components 506, 508 can make an inference based on which information to include in a message, which information does not need to be included in the message, how frequently a message should be transmitted, or combinations thereof.

As used herein, the term "inference" refers generally to the process of reasoning about or inferring states of a system, a component, a module, an environment, and/or devices from a set of observations as captured through events, reports, data and/or through other forms of communication. Inference can be employed to identify a specific context or information, or can generate a probability distribution over states, for example. The inference can be probabilistic. For example, computation of a probability distribution over states of interest based on a consideration of data and/or conditions. The inference can also refer to techniques employed for composing higher-level information from a set of conditions and/or data. Such inference can result in the construction of new conditions and/or actions from a set of observed conditions and/or stored conditions data, whether or not the conditions are correlated in close temporal proximity, and whether the conditions and/or data come from one or several conditions and/or data sources. Various classification procedures and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with the selection of a message from a set of messages, embedding information in the message, selecting a preamble, decoding a message, and so forth) can employ various artificial intelligence-based procedures for carrying out various aspects thereof.

A classifier is a function that maps an input attribute vector, x=(x1, x2, x3, x4, xn), to a confidence that the input belongs to a class. In other words, f(x)=confidence(class). Such classification can employ a probabilistic and/or statistical-based analysis (e.g., factoring into the analysis utilities and costs) to provide a prognosis and/or infer one or more actions that should be employed to determine what information should be automatically included in a message at a particular moment in time (e.g., at about the same time as a request is received from the network device 104, at about the same time as information indicative of a location is received at the communication device 102, and so on).

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing proxy information, by receiving extrinsic information about device location, by converting information of a location into binary data, and so on). For example, SVM's can be configured through a learning or training phase within a classifier constructor and feature selection module. Thus, a classifier(s) can be used to automatically learn and perform a number of functions, including, but not limited to, determining according to a predetermined criteria which messages to select from a group of messages, when to include information, when to exclude information, and so forth. The criteria can include, but is not limited to, similar requests, historical information, and so forth.

Additionally, or alternatively, an implementation procedure (e.g., a rule, a policy, and so on) can be applied to control and/or regulate information in order to mitigate an amount of unnecessary overhead, and so forth. In some implementations, based upon a predefined criterion, the rules-based implementation can automatically and/or dynamically interpret proxy information and/or other information. In response thereto, the rule-based implementation can automatically interpret and carry out functions associated with the message by employing a predefined and/or programmed rule(s) based upon any desired criteria.

Figure 6:
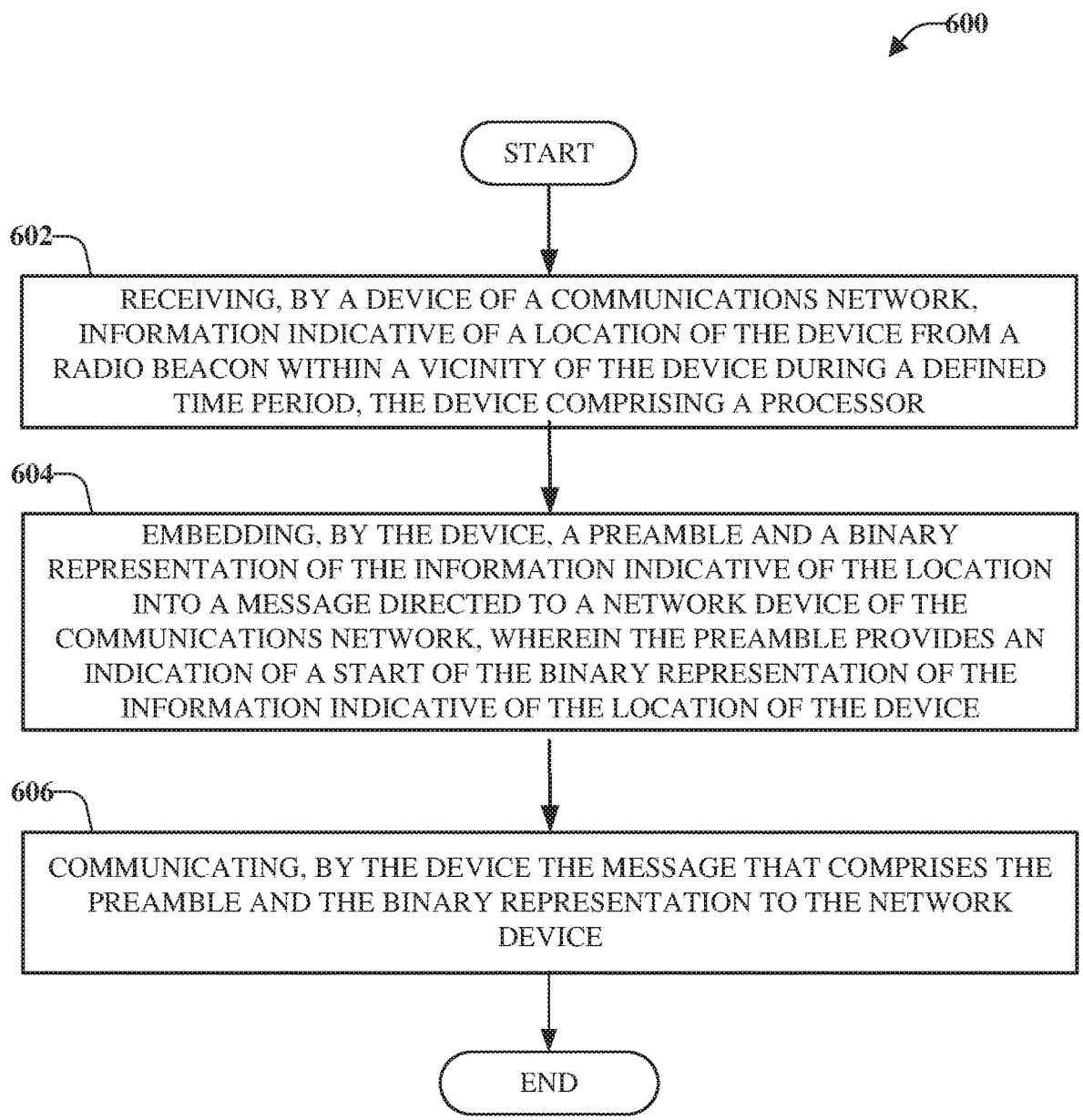
FIG. 6 illustrates an example, non-limiting, method for embedding location information into one or more messages in accordance with one or more embodiments described herein.

FIG. 6 illustrates an example, non-limiting, method 600 for embedding location information into one or more messages in accordance with one or more embodiments described herein. Repetitive description of like elements employed in other embodiments described herein is omitted for sake of brevity.

The method 600 can be implemented by a UE (e.g., the communication device 102) of a wireless network, the UE comprising a processor. Alternatively, or additionally, a machine-readable storage medium can comprise executable instructions that, when executed by a processor, facilitate performance of operations for the method 600.

The method 600 starts, at 602, when information indicative of a location of the device is received from a radio beacon within a vicinity of the device during a defined time period. For example, the information indicative of the location can be actual location information determined by the device (e.g., via a GPS integrated on the device, via another location determination component integrated on the device). According to some implementations, the information indicative of the location is received from another device that is communicatively coupled to the device.

In an example, the information indicative of the location of the device can be proxy information that is related to the location of the device. The proxy information does not comprise global positioning system information.

A preamble and a binary representation of the information indicative of the location can be embedded into a message, at 604. The message can be directed to a network device of the communications network. Embedding the binary representation can comprise embedding the binary representation in a group of least significant bits of the message. Further, the preamble can provide an indication of a start of the binary representation of the information indicative of the location of the device. The preamble can comprise a synchronization signal of bits. At 606, the message that comprises the preamble and the binary representation can be communicated to the network device.

Figure 7:
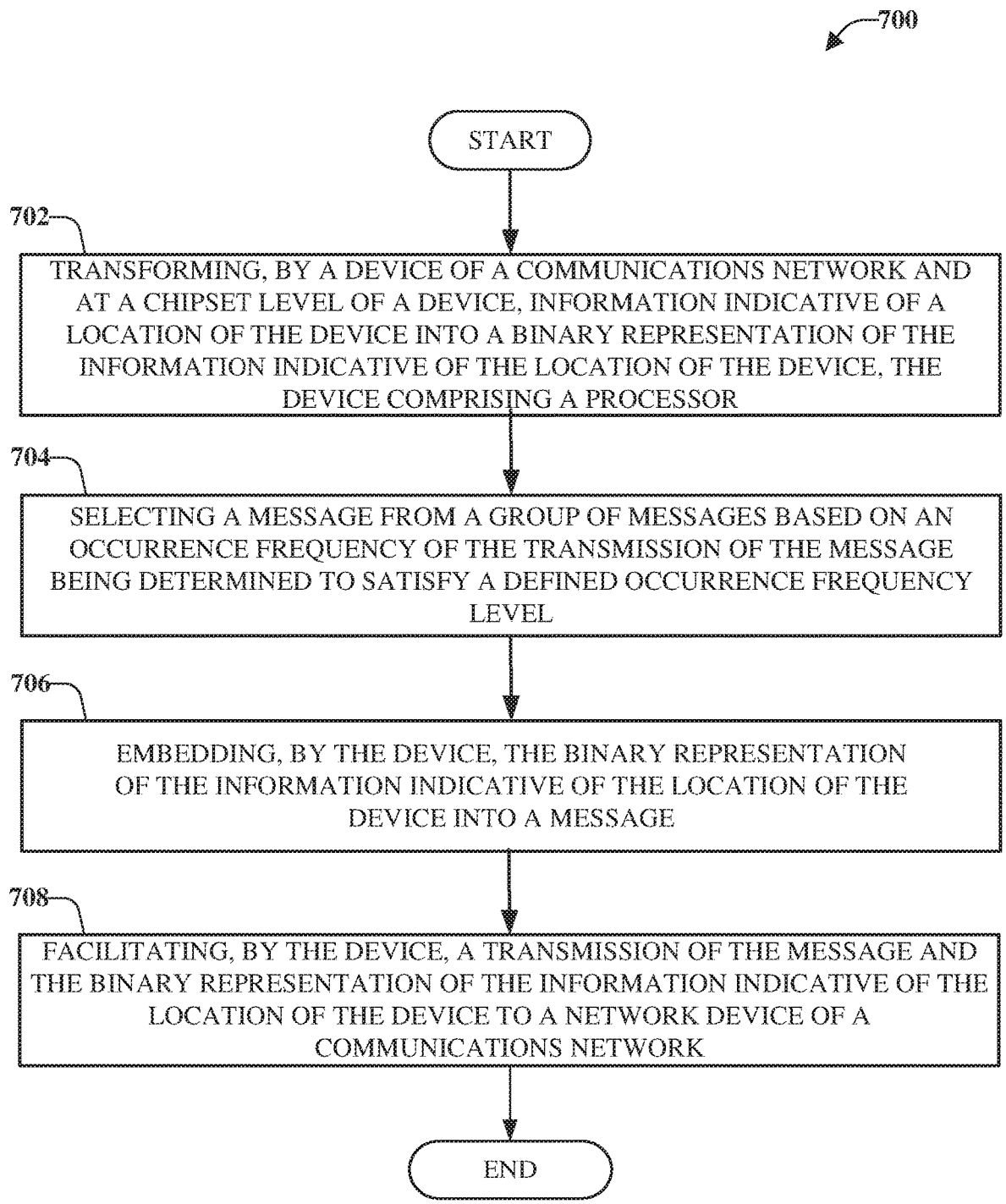
FIG. 7 illustrates an example, non-limiting, method for conveying information, including location information to one or more network devices in accordance with one or more embodiments described herein.

FIG. 7 illustrates an example, non-limiting, method 700 for conveying information, including location information to one or more network devices in accordance with one or more embodiments described herein. Repetitive description of like elements employed in other embodiments described herein is omitted for sake of brevity.

The method 700 can be implemented by a UE (e.g., the communication device 102) of a wireless network, the UE comprising a processor. Alternatively, or additionally, a machine-readable storage medium can comprise executable instructions that, when executed by a processor, facilitate performance of operations for the method 700.

At 702, information indicative of a location of the device can be transformed into a binary representation of the information indicative of the location of the device. According to some implementations, the transformation can be at a chipset level of the device.

The information indicative of the location of the device can be received from a radio beacon within a vicinity of the device during a defined time period. In an example, the information indicative of the location of the device can be proxy information that is related to the location of the device, and that is indirectly converted into location information. In another example, the radio beacon can be received from a Wi-Fi enabled device via a Wi-Fi communications link of the communications network. In another example, the radio beacon can be received from a Bluetooth enabled device via a Bluetooth communications link of the communications network. In yet another example, the radio beacon can be received from a near field communication enabled device via a near field communications link of the communications network.

A message from a group of messages can be selected at 704. The selection can be based on an occurrence frequency of the transmission of the message being determined to satisfy a defined occurrence frequency level. For example, the defined occurrence frequency level can be selected to retain a defined radio link performance level of a radio link of the communications network.

At 706, the binary representation of the information indicative of the location of the device can be embedded into the selected message. For example, embedding the binary representation can comprise embedding the binary representation in least significant bits of the message. According to some implementations, embedding the binary representation can comprise using steganography to embed the binary representation in the message.

The message and the binary representation of the information indicative of the location of the device can be transmitted, at 708, to a network device of a communications network. According to some implementations, prior to the transmission of the message, a preamble that indicates a start of the binary representation of the information indicative of the location of the device can be conveyed to the network device.

Figure 8:
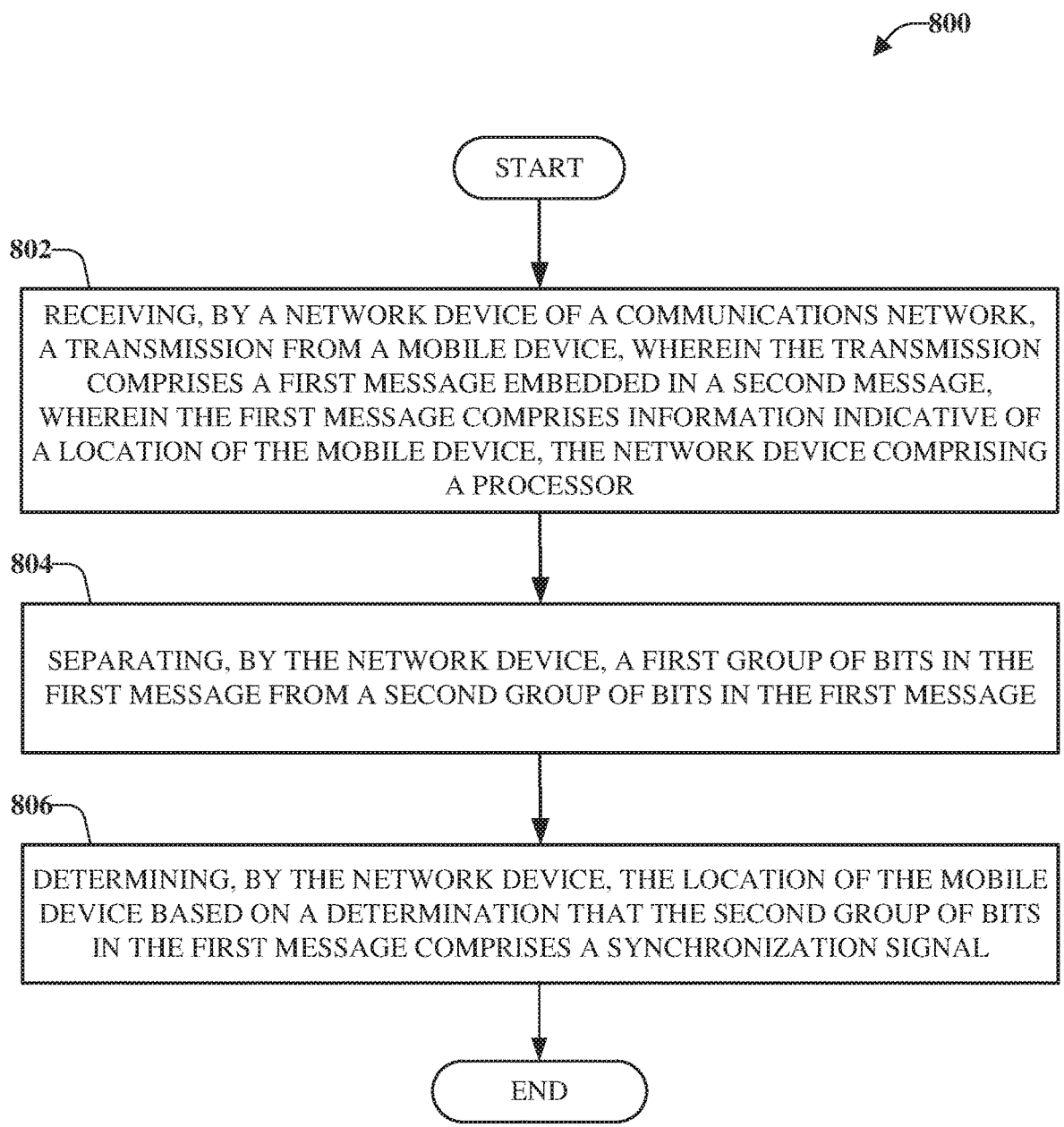
FIG. 8 illustrates an example, non-limiting, method for receiving information, including location information, from one or more mobile devices in accordance with one or more embodiments described herein.

FIG. 8 illustrates an example, non-limiting, method 800 for receiving information, including location information, from one or more mobile devices in accordance with one or more embodiments described herein. Repetitive description of like elements employed in other embodiments described herein is omitted for sake of brevity.

The method 800 can be implemented by a network device (e.g., the network device 104) of a wireless network, the network device comprising a processor. Alternatively, or additionally, a machine-readable storage medium can comprise executable instructions that, when executed by a processor, facilitate performance of operations for the method 800.

The method 800 can start, at 802, with receiving a transmission from a mobile device (e.g., the mobile device). The transmission can comprise a first message embedded in a second message. The first message can comprise information indicative of a location of the mobile device. In an example, the first message and the second message can be received signal code power messages.

At 804, a first group of bits in the first message can be separated from a second group of bits in the first message. According to some implementations, the first group of bits in the first message are least significant bits of the first message. Further, at 806, a location of the mobile device can be ascertained based on a determination that the second group of bits in the first message comprises a synchronization signal. In an example, determining the location of the mobile device can comprise translating the information indicative of the location of the mobile device to a geographic location of the mobile device.

In some implementations, the method 800 can comprise determining that the least significant bits of the first message constitute a preamble that indicates the information indicative of the location of the mobile device is included in the second group of bits of the first message.

While, for purposes of simplicity of explanation, some methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating channel state information determination and reporting in wireless communication systems for advanced networks are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Multiple Input, Multiple Output (MIMO) systems can significantly increase the data carrying capacity of wireless systems. For these reasons, MIMO is an integral part of the $3^{rd}$ and $4^{th}$ generation wireless systems. 5G systems can also employ MIMO systems, also called massive MIMO systems (e.g., hundreds of antennas at the Transmitter side and/Receiver side). In an example of a $(N_t, N_r)$ system, where $N_t$ denotes the number of transmit antennas and $N_r$ denotes the receive antennas, and where N is an integer, the peak data rate multiplies with a factor of $N_t$ over single antenna systems in rich scattering environment.

Described herein are systems, methods, articles of manufacture, and other embodiments or implementations that can facilitate channel state information determination using demodulation reference signals in advanced networks. Facilitating channel state information determination using demodulation reference signals in advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 9:
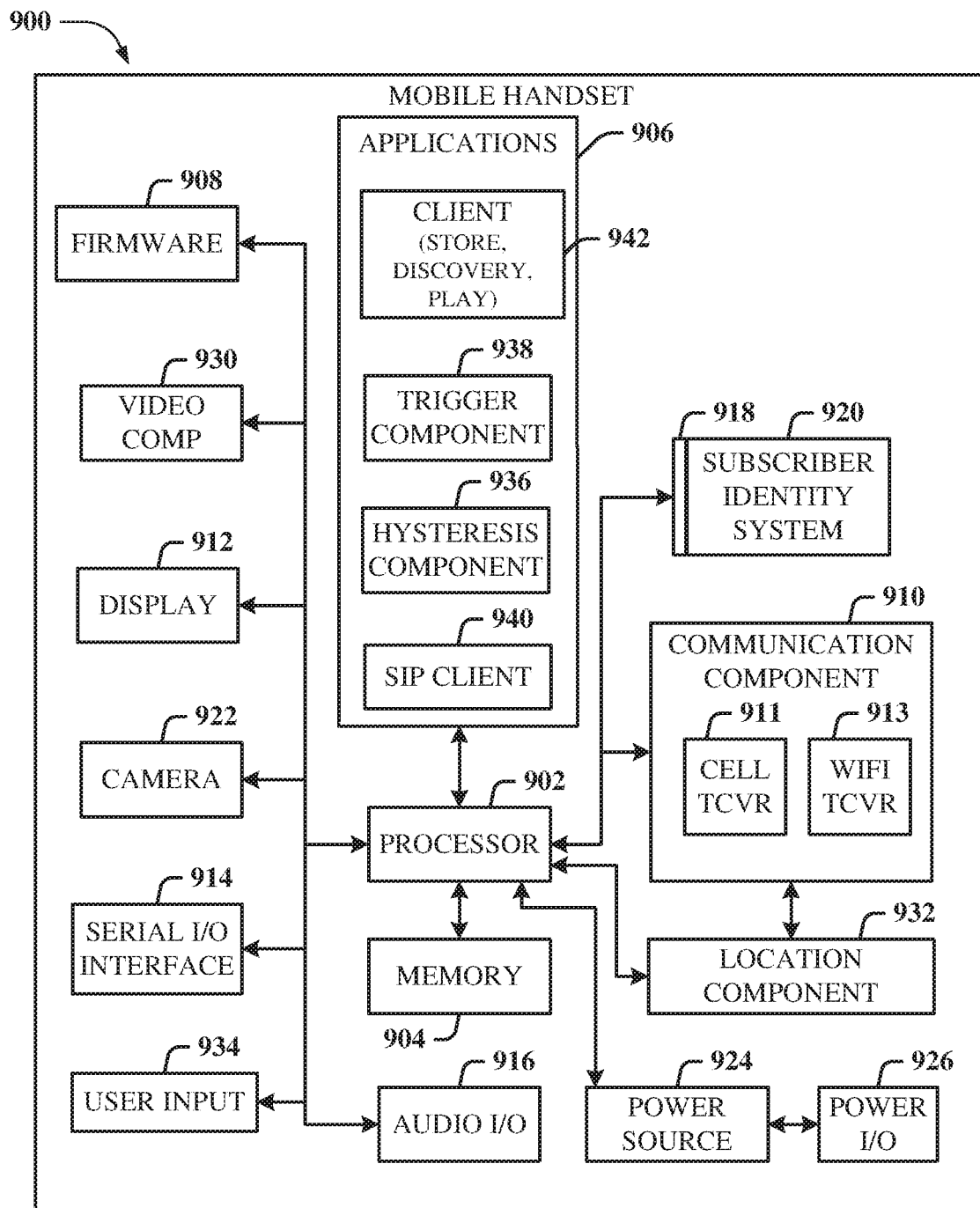
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power 110 component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
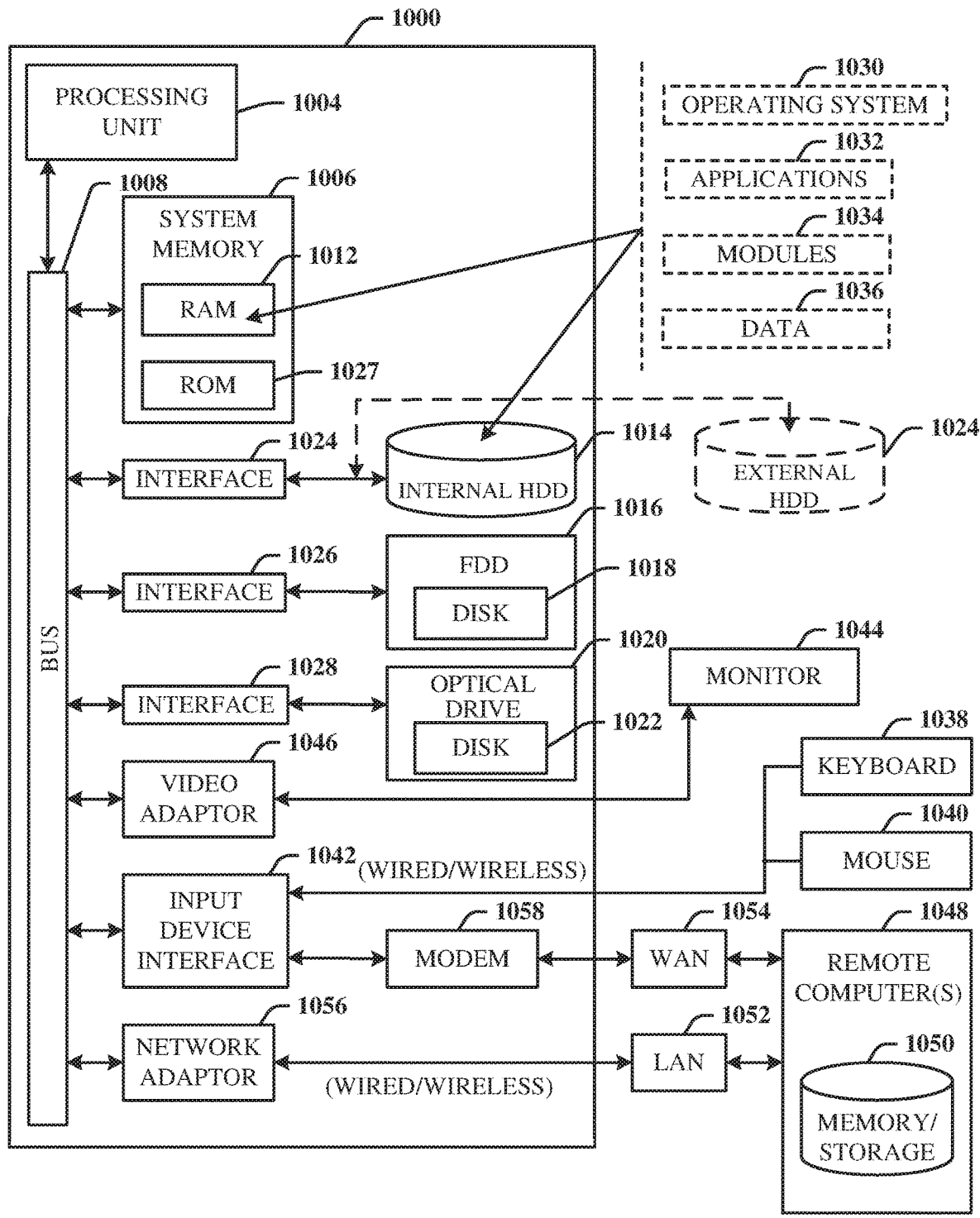
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 7 Mbps (802.11a) or 54 Mbps (802.11b) data rate, for example, or with products that contain both bands (dual band), so the networks can provide real-world performance similar to the basic 16 BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    selecting, by a user equipment comprising a processor, a message from a group of messages, wherein the selecting is based on an occurrence frequency of a transmission of the message being determined to satisfy a defined occurrence frequency level;
    embedding, by the user equipment, a binary representation of information indicative of a location of the user equipment in least significant bits of the message; and
    transmitting, by the user equipment to network equipment, the message and the binary representation of information indicative of the location of the user equipment.

2. The method of claim 1, further comprising:
    prior to the transmitting, converting, by the user equipment, information indicative of the location of the user equipment into the binary representation.

3. The method of claim 2, wherein the converting comprises translating location information into the information indicative of the location at a radio chipset level of the user equipment.

4. The method of claim 1, wherein the message is a first message, and wherein the method further comprises:
    prior to the transmitting, embedding, by the user equipment, the binary representation via steganography, wherein the steganography facilitates concealing the first message in a second message.

5. The method of claim 1, wherein the message is a layer 2 embedded message.

6. The method of claim 1, further comprising:
    converting, by the user equipment, ranging information into the information indicative of the location of the user equipment, wherein the ranging information is measured timing offsets of cell sites.

7. The method of claim 1, wherein the transmitting comprises transmitting the message and the binary representation via a fifth generation network communication protocol.

8. A system, comprising:
    a processor; and
    a memory that stores executable instructions that, when executed by the processor, facilitate performance of operations, comprising:
        dividing a message into a first group of bits and a second group of bits, wherein the message comprises information indicative of a location of a user equipment; and
        determining the location of the user equipment based on a determination that the second group of bits comprise a synchronization signal.

9. The system of claim 8, wherein the first group of bits in the message are least significant bits of the message.

10. The system of claim 9, wherein the operations further comprise:
    determining that the least significant bits constitute a preamble that indicates the information indicative of the location of the user equipment is included in the second group of bits.

11. The system of claim 8, wherein the determining comprises translating the information indicative of the location of the user equipment to a geographic location of the user equipment.

12. The system of claim 8, wherein the operations further comprise:
    prior to the dividing, receiving a transmission that comprises a first message embedded in a second message, wherein the first message comprises information indicative of the location of the user equipment.

13. The system of claim 12, wherein the first message and the second message are received signal code power messages, and wherein the first message and the second message are received from the user equipment via a fifth generation network communication protocol.

14. A non-transitory machine-readable medium, comprising executable instructions that, when executed by a processor, facilitate performance of operations, comprising:
    embedding a preamble and a binary representation of information indicative of a location of first network equipment into a message directed to second network equipment; and
    facilitating a transmission of the message that comprise the preamble and the binary representation to the second network equipment.

15. The non-transitory machine-readable medium of claim 14, wherein the embedding comprises embedding the binary representation into a group of least significant bits of the message, and wherein the preamble comprises a synchronization signal of bits.

16. The non-transitory machine-readable medium of claim 14, wherein the operations further comprise:
    prior to the embedding, receiving the information indicative of the location of the first network equipment from a radio beacon within a vicinity of the first network equipment.

17. The non-transitory machine-readable medium of claim 16, wherein the radio beacon is received from a near field communication enabled device via a near field communications network link.

18. The non-transitory machine-readable medium of claim 16, wherein the radio beacon is received from a Wi-Fi enabled device via a Wi-Fi communications network link.

19. The non-transitory machine-readable medium of claim 16, wherein the radio beacon is received from a Bluetooth enabled device via a Bluetooth communications network link.

20. The non-transitory machine-readable medium of claim 16, wherein the facilitating comprises facilitating the transmission of the message via a new radio network communication protocol.

\* \* \* \* \*